No. 707,393. Patented Aug. 19, 1902.
W. N. CROW.
BAND CUTTER AND FEEDER.
(Application filed Oct. 28, 1901.)
(No Model.) 2 Sheets—Sheet 1.
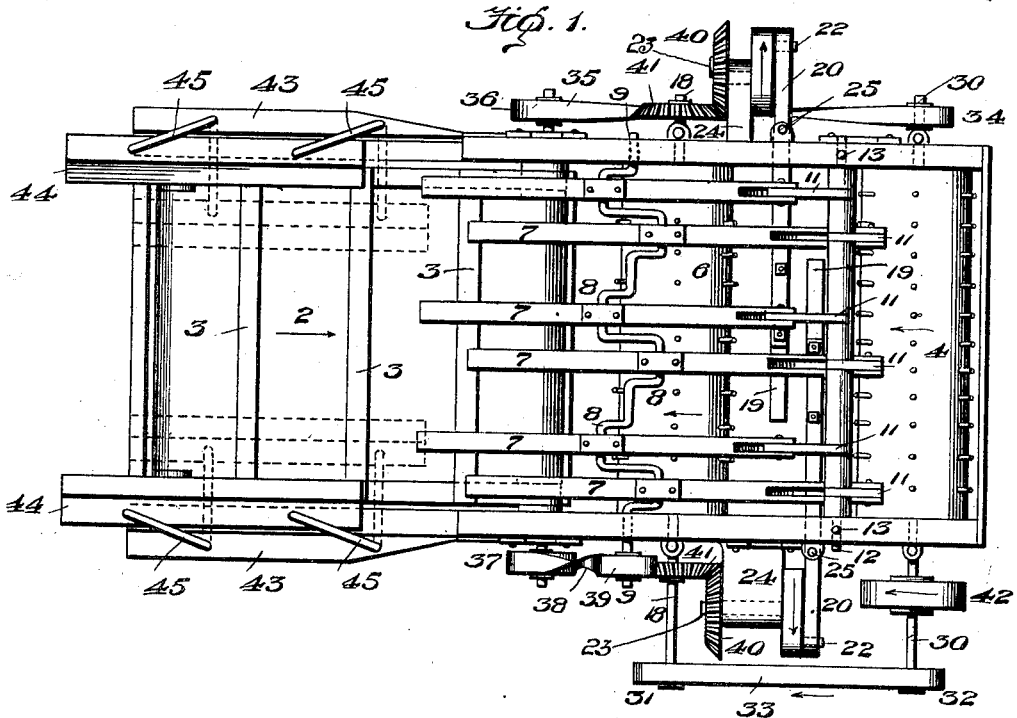
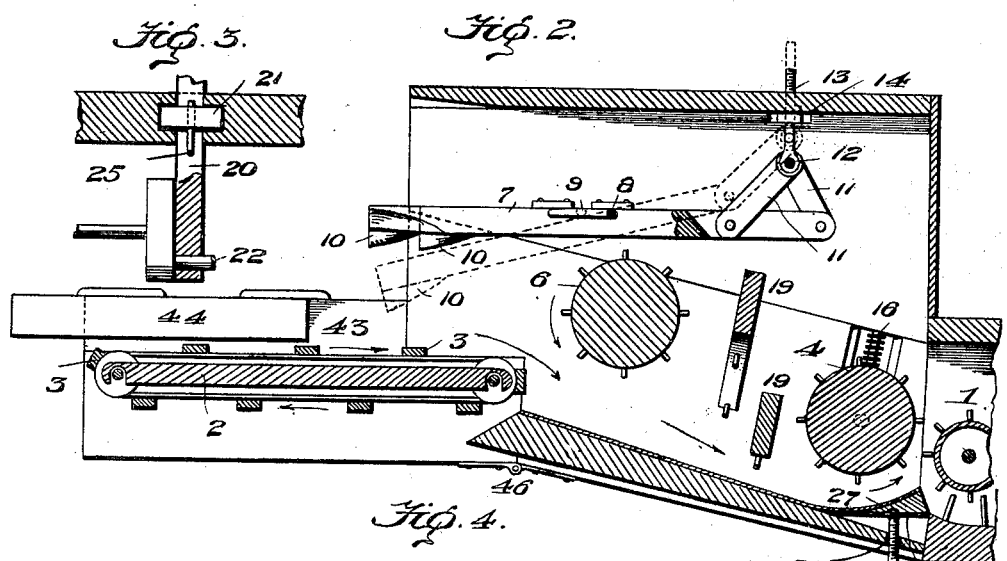
WITNESSES:
INVENTOR
William N. Crow
by Johnson and Johnson
ATTORNEYS
THE NORRIS PETERS CO., PHOTO-LITHO., WASHINGTON, D. C.

No. 707,393. Patented Aug. 19, 1902.
W. N. CROW.
BAND CUTTER AND FEEDER.
(Application filed Oct. 28, 1901.)
(No Model.) 2 Sheets—Sheet 2.
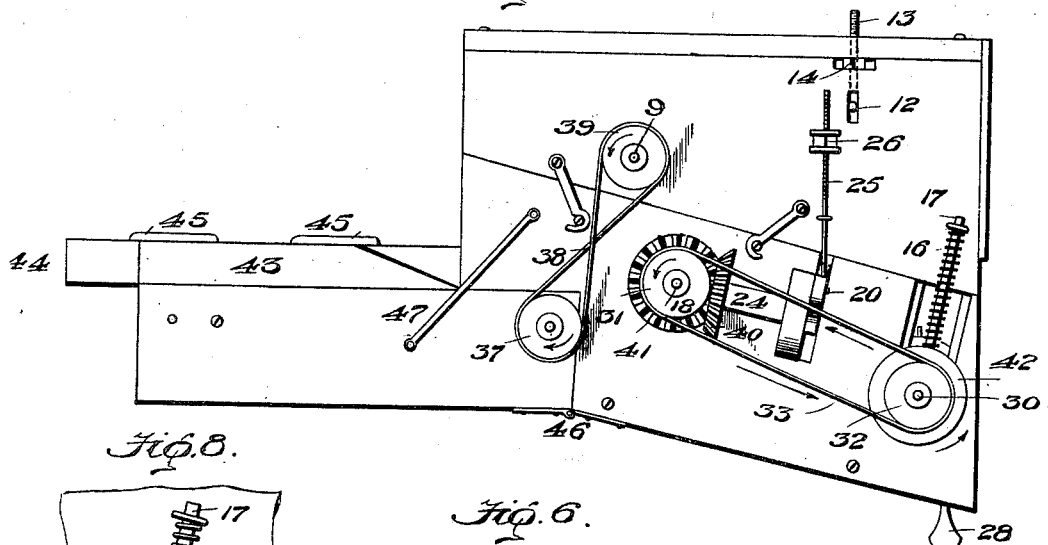
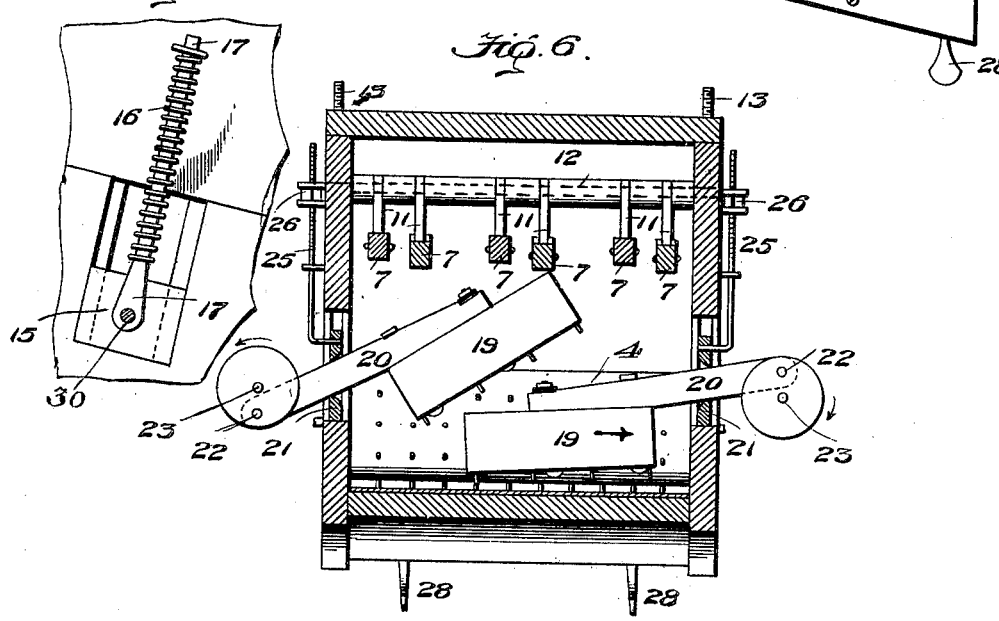
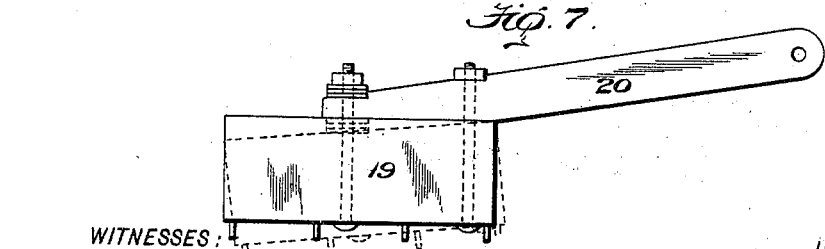
WITNESSES: INVENTOR
William N. Crow
John E. Burch by Johnson and Johnson
ATTORNEYS

UNITED STATES PATENT OFFICE.

WILLIAM N. CROW, OF CROMWELL, INDIANA.

BAND-CUTTER AND FEEDER.

SPECIFICATION forming part of Letters Patent No. 707,393, dated August 19, 1902.

Application filed October 28, 1901. Serial No. 80,246. (No model.)

*To all whom it may concern:*

Be it known that I, WILLIAM N. CROW, a citizen of the United States, residing at Cromwell, in the county of Noble and State of Indiana, have invented certain new and useful Improvements in Band-Cutters and Feeders, of which the following is a specification.

For cutting the bands of bound sheaves and for spreading and feeding the grain to the cylinder of the threshing-machine I have designed certain improvements, which are illustrated in the accompanying drawings, which, in connection with the following description and the claims appended thereto, will particularly set out the parts and combinations of parts which constitute the invention.

In the drawings, Figure 1 shows the band-cutting and feeding mechanism in top view, the top of the inclosing frame removed. In this view the novel relation of the grain-feeding toothed rolls, with the grain-spreaders, which have both horizontal, reciprocating, and chopping movements between the rolls, is seen. Fig. 2 is a vertical longitudinal section of the same. Fig. 3 shows in top view the connection of the spreader-arm 20, with its operating-crank 22 and with its fulcrum or hanger 21 in the closure-wall. Fig. 4 shows in detail the means of adjusting the supplemental bottom 5 in its relation to the toothed roll 4 at the mouth of the closure of the threshing-cylinder. Fig. 5 is the right side of the machine, showing the manner of operating all the feeding and band-cutting parts from the toothed roll which delivers the grain to the threshing-cylinder. Fig. 6 is a transverse section taken along one of the grain-spreaders, showing their fulcrum-hangers and their operating crank connections. Fig. 7 shows one of the grain-spreaders and the means for leveling it with respect to the floor of the inclosing frame. Fig. 8 shows in side view the spring-pressed shaft 30 of the toothed roll 4 and the journal-bearing for said shaft.

A suitable box-frame contains the operating parts and is connected at one end to the threshing-machine, so as to deliver the grain to the threshing-cylinder 1. The other end of this box-frame forms an open platform or table 2, over and upon which feed-slats 3 are caused to travel to carry the sheaf to the band-cutters and to the feeders. In the usual manner the feed-slats are fixed to endless bands, which are mounted on rolls which are mounted in the sides of box-frame, the inner roll terminating at the inner end of the platform and the slats delivering the grain below the feed-platform upon the bottom, which extends on a downward incline to its junction with the closure of the threshing-cylinder. Mounted on the sides of the box-frame is a toothed roll 4, the purpose of which is to give a rolling regulated feed to the grain from the fixed bottom of the box-frame to the threshing-cylinder. This rolling feed is regulated by an adjustable supplemental bottom 5 in a way and for a purpose which I will presently state. At the inner end of the traveling feeding slatted belts a toothed roll 6 is mounted in the sides of the box-frame and is caused to rotate in the same direction as the travel of the slatted belts and preferably with its lower side a little lower than the plane of the slatted belts. The function of this roll 6 is to receive the grain from the platform slatted feeder and deflect it with a rolling feed down upon the bottom. Above this toothed roll are mounted knife-arms 7 for cutting the band of the sheaf. A plurality of arms—say about six—for this purpose are mounted each on a separate crank 8 of a shaft 9, having its bearings in the sides of the box-frame. These arms are parallel to each other, their front ends projecting over the platform and having the cutting-blades 10, the rear ends of the arms being suspended by links 11 to a horizontal rod 12, the ends of which are adjustably mounted in the sides of and at the top of the box-frame, whereby the rotation of the crank-shaft will cause each of the arms to have a horizontal, reciprocating, and chopping action to cut the sheaf-band as the sheaf is fed under the knives, and when one of these spreaders is up and moving inward the other is down and moving outward, as in Fig. 6. A feature in these band-cutters is the provision for adjusting the suspended ends of the arms, whereby the bladed ends are caused to be adjusted nearer to or farther from the endless feeder to give efficient cutting action in different sizes of sheaves. By raising the suspending-rod 12 lowers the knives, and vice versa. The normal adjustment of the knives gives them a stroke high enough to cut the bands of a sheaf which may be on top of an under sheaf, (as sometimes happens,) and the downward strokes of the knives will pass through the first sheaf, and thus also cut the bands of the under sheaf. The knives or blades may be about eight inches long, three inches wide at the end of the arm, and taper back to the arm and sickle-edged. The adjustment of the knives is made to suit different lots of sheaves, and where the work to be done is with large sheaves the knives will be set raised for a higher stroke, while in another job where the sheaves are smaller the knives will be set lower. For this adjustment I have provided for suspending the rod 12 in vertical slots in the sides of the box-frame by means of screw-threaded rods 13, passing vertically through nuts 14, set in or fixed on the frame-walls so the turning of these nuts raises or lowers the suspended rod 12 and holds it to such adjustment, as in Figs. 2 and 5.

At the end of the box-frame which joins the open end of the closure of the threshing-cylinder the toothed roll 4 is mounted in suitable journal-bearings 15, fitted in slots in the sides of the frame, Fig. 8, and constantly pressed downward by springs 16, coiled on rods 17, the lower ends of which engage the shaft of the toothed roll, their upper ends retained in eyed brackets on the outer sides of the frame, so that the springs pressing against said eyed brackets constantly force the roller-journal bearings down and allow the roll to rise and fall and to constantly exert a pressure upon the straw as the rotation of the roll forces the straw out to the threshing-cylinder and serves to prevent the latter from jerking the grain under the roller and choking the separator. In this function the toothed roll holds the grain down while rolling it out and renders such rolling out uniform. The rolling of the grain from the slatted platform is to cause the grain to be delivered beneath spreader-bars 19, arranged and operated between the two toothed feed-rolls at right angles to the feed of the grain, as I will now state. These spreader-bars are about half the length of the toothed rolls, are provided with pins on their under edges, and are adjustably attached to arms 20, which pass through slots in hangers 21, fitted to be adjusted vertically in openings in the frame sides, as in Figs. 3 and 6. They are each arranged side by side, and the arm of each is connected by a crank-pin 22 of a short shaft 23, mounted in a bracket 24 on the outer side of the frame, so that the rotation of the shafts 23 reciprocates the spreaders over and spreads the cut sheaf as it is fed to the feeding-roll 4. As shown in Fig. 6, this spreading action is made by the outward movement of the toothed spreader-bar, and when one is thus acting with its toothed edge level with the bottom of the closure the other toothed bar is raised as it is moved inward in position to be forced down and out in its leveling action on the grain. In this vertical swinging movement each spreader describes a circle produced by the rotation of the crank-pin and the fixed bearing 21, which acts as a fulcrum or hanger for the spreader-arm 20. A screw-rod 25 engages each fulcrum-hanger 21, which the spreader-arm may raise and lower to suit large or small sheaves by turning the nut 26, fixed in brackets and through which and the nuts the screw-rods pass at the outer walls of the closure, as in Fig. 6. I prefer that the closure-bottom shall be covered with sheet-tin, extending beneath the feed-roll 4 in a free part 27, and to this part screws 28 are engaged and passing through nuts 29 in the bottom serve to raise and lower this unfastened bottom part, and thereby regulate the space between it and the toothed roller to suit the character—wet or dry—of the grain. The adjustment of the supplemental bottom is to regulate the feed-space when the toothed roll is set in its lowest or normal position. The shaft 18 of the front toothed roll 6 and the shaft 30 of the rear toothed roll 4 are extended at each side of closure-frame, and, as shown in Fig. 1, these shafts have pulleys 31 32, which are connected by a band 33, whereby both toothed rolls are rotated in the same direction, as indicated by the arrows in Figs. 1 and 2, so that the grain is fed by a positive movement to the threshing-cylinder by the stated endless belts, by the toothed roll 6, and by the toothed roll 4, the two feed-rolls acting on the grain after the tie-band has been cut. A pulley 34 on the other end of the shaft 30 connects by a crossed band 35 with a pulley 36 on the end of the shaft of the inner roll of the endless-slat feeder, whereby the latter is driven from the rear toothed roll 4. A pulley 37 on the other end of this endless-slat roll-shaft connects by a crossed belt 38 with a roll 39 on the crank-shaft 9, whereby the band-cutting arms are operated from the rear toothed roll 4 by the crossed belt 35. The short shafts of the crank-pins 22, which operate the spreaders, have each a bevel-gear 40, which engages a bevel-gear 41 on the shaft 18 of the front toothed roll 6, whereby the front toothed roll is operated from the rear toothed roll by the belt 33. Therefore, looking at Figs. 1 and 2, it will be seen that from the power-driven pulley 42 on the shaft 30 of the rear toothed roll the operation of the band-cutting and feeding devices are effected each in the direction indicated by the arrows, and looking at Fig. 2 it is seen how important is the relation of the toothed feed-rolls to the spreaders, whereby the grain from the feed-slats is delivered to spreaders having a rising-and-falling movement between the rolls, because a mere reciprocating movement of the spreaders under such arrangement would be impracticable.

It is important to note that the thinning and spreading of the cut sheaf by the downward and outward stroke of the thin spreader-board 19, which at its toothed edge freely enters the grain and thins it by a leveling movement from the center toward the sides of the closure-walls. In this thinning and leveling movements of the spreader-boards their upward and inward movements to lift their teeth above and free of the grain must be positive, and this is effected by the provision of the fulcrum-hangers 21, on which the spreader-arms are caused to have a vertically-rocking movement.

The receiving-table for the sheaf has side boards 43, and to these inner side boards 44 are hung by links 45, so that the latter can be set inward and toward each other, as seen by dotted lines in Fig. 1, to narrow the space on the slatted platform in feeding wet grain and widening the platform in feeding dry grain, as seen in full lines in Fig. 1, to prevent choking the machine. When the supplemental boards are set in toward each other, the links swing with them and in such adjustment the side boards are held. At 46 the feeding-platform is hinged to the box-frame to allow the feeding-platform to be turned and fastened under the box-frame by the same links 47 by which said platform is secured in feeding position when the machine is being moved from place to place.

While the arrangement shown and described causes all the operating parts to be driven from the toothed feed-cylinder 4, obviously a pulley on the crank-shaft 9 of the band-cutters may be used as the power-driven pulley.

In the machine the pair of spreaders are connected to the driving power, so that each operates to pull the grain from the middle to the sides of the closure in leveling the cut sheaf; but obviously one spreader may operate to pull the grain from the center while the other may pull toward the center. The toothed cylinders may both be fixed or both spring-pressed, and the gearing and the belt connections may be made in any way as may seem best to the constructor, so long as the toothed rolls are caused to rotate in the same direction.

Looking at Fig. 6 it will be noted that the smooth fixed bottom provides a more effective action for the teeth of the spreader-arms and for the teeth of the roll 4 than could be given by slatted endless feeders, while the provision for vertically adjusting the toothed spreader-arms and for vertically adjusting the delivering end of the smooth bottom in its relation to the spring-pressed toothed roll adapts the working of these parts to suit wet or dry grain.

I claim—

1. In a band-cutter and feeder and in combination, a closure-frame, an endless-platform feeder, means for cutting the sheaf-bands, a pair of spreader-arms, a pair of hangers, one for each spreader-arm in the opposite walls of the frame, a crank-shaft connecting the outer end of each spreader, at the opposite sides of the closure, means for operating each crank-shaft, for causing each spreader to have opposite inward and outward movement upon their hangers, the outward movement of one alternating with the inward movement of the other, a toothed roll delivering the grain to the spreaders and a toothed roll drawing the grain from the spreaders.

2. In a band-cutter and feeder, the combination with an endless-platform feeder and sheaf-band cutters, of a pair of grain-spreading arms, each mounted in the opposite sides of the frame in parallel lapping relation to each other, means for causing each spreader to have a horizontal movement in opposite directions, a toothed feed-roll between the delivering end of the platform-feeder and the spreaders and a toothed feed-roll at the rear of the spreaders the two spreader-arms evening the grain alike from the center to the sides.

3. In a band-cutter and feeder, and in combination, an endless-platform feeder, band-cutting arms, a pair of toothed feed-rolls, a pair of spreader-arms, each arm separately fulcrumed in the opposite sides of the closure, a crank-shaft separately connecting the outer end of each spreader-arm at the opposite sides of the closure, gear 40 41 separately connecting each crank-shaft, with the feed-roll 6, a belt 33 connecting the pair of feed-rolls and the power-driven pulley 42 on the shaft of the feed-roll at the delivery end of the closure.

4. In a band-cutter and feeder and in combination, an endless-platform feeder, a downwardly-inclined fixed bottom supplemented by a sheet-metal surface terminating at its delivering end in a raised curved part, a toothed roll at the end of said fixed bottom and screws in the fixed bottom engaging the sheet-metal part to adjust it in relation to the roll.

5. In a band-cutter and feeder and in combination, a closure-frame, an endless slatted traveling platform, cutters for severing the sheaf-bands, a toothed roll at the delivering end of the closure, a fixed bottom having a smooth surface extending from the traveling platform and terminating in an integral upward-curved part, and means for adjusting said integral bottom part in its relation to the teeth of the roll.

6. In a band-cutter and feeder and in combination, an endless-platform feeder, a downwardly-inclined fixed feed-bottom having a smooth surface and terminating in a raised curved end, a toothed feed-roll arranged to pull the grain over said raised curved end, a toothed spreader-arm supported in each side of the closure, and means separately connecting and operating each spreader-arm to cause it to spread and even the grain from the center toward the sides of the closure as the grain is moved to said roll.

7. In a band-cutter and feeder and in combination with a closure-frame, an endless-platform feeder, band-cutters and a feed-roll at the delivering end of the platform-feeder, a pair of spreader-arms passing through each side of the closure, a pair of hangers one for each spreader-arm secured in the wall-opening through which the arm passes, means for vertically adjusting the fulcra of the hangers, and means whereby the spreader-arms are reciprocated and vertically rocked upon their respective hangers toward and from each other.

In testimony whereof I affix my signature in presence of two witnesses.

WILLIAM N. CROW.

Witnesses:
WILLIAM R. WRIGHT,
CHAUNCEY M. SLOAN.